United States Patent [19]

Browning et al.

[11] 4,016,022
[45] Apr. 5, 1977

[54] LOW FLOW, VACUUM BAG CURABLE PREPREG MATERIAL FOR HIGH PERFORMANCE COMPOSITE SYSTEMS

[75] Inventors: Charles E. Browning; Theodore J. Reinhart, Jr., both of Dayton, Ohio

[73] Assignee: The United States of America as represented by the Secretary of the Air Force, Washington, D.C.

[22] Filed: Dec. 30, 1975

[21] Appl. No.: 645,154

[52] U.S. Cl. ............... 156/285; 156/289; 156/330; 260/32.8 EP; 260/837 R; 260/836; 428/116; 428/408; 428/322; 428/413; 428/367; 428/418

[51] Int. Cl.² ......................................... B29C 17/00

[58] Field of Search .......... 156/330, 174, 334, 181, 156/285, 306, 286, 307, 289, 308; 428/408, 367, 413, 116, 416, 322, 418, 73, 118; 264/90, 256, 101, 347; 260/32.8 A, 32.8 EP, 836, 837 R; 427/386

[56] References Cited

UNITED STATES PATENTS

| | | | |
|---|---|---|---|
| 2,952,579 | 9/1960 | Merriman | 428/118 |
| 3,666,600 | 5/1972 | Yoshino | 156/285 |
| 3,759,777 | 9/1973 | Lubowitz et al. | 156/334 |
| 3,814,653 | 6/1974 | Heier | 156/285 |
| 3,855,176 | 12/1974 | Skidmore | 260/837 R |
| 3,931,354 | 1/1976 | Sheppard et al. | 428/367 |

*Primary Examiner*—Charles E. Van Horn
*Assistant Examiner*—J. J. Gallagher
*Attorney, Agent, or Firm*—Joseph E. Rusz, Cedric H. Kuhn

[57] ABSTRACT

A composite prepreg material comprising a carboxy-terminated polybutadiene, an epoxy novolak resin, a carboxylic acid accelerator and an epoxy catalyst. When reinforced with well known reinforcing fibers or filaments, the material is eminently suitable for use in the fabrication of structural composites.

13 Claims, No Drawings

LOW FLOW, VACUUM BAG CURABLE PREPREG MATERIAL FOR HIGH PERFORMANCE COMPOSITE SYSTEMS

RIGHTS OF THE GOVERNMENT

The invention described herein may be manufactured and used by or for the Government of the United States for all governmental purposes without the payment of any royalty.

FIELD OF THE INVENTION

This invention relates to a low flow, vacuum bag curable prepreg material. In one aspect it relates to a method for preparing the prepreg material. In another aspect it relates to a high performance composite and a method for its preparation. BACKGROUND OF THE INVENTION One of the most important of recent developments in aircraft design concerns the use of composites to replace parts made entirely from metal. For example, in Aviation Week & Space Technology, page 22, Oct. 13, 1975, it is disclosed that graphite composites are being considered for the rudder, elevator, ailerons, spoilers, inboard flaps and cabin floor panels for the DC-X-200 wide body transport. A significant advantage in the use of composites is the saving in weight, a particularly important advantage in military aircraft.

In the conventional method for fabricating composites, carbon or graphite fibers are impregnated with a prepreg material, such as an epoxy resin. It is necessary to use a large excess of resin because of resin loss in a subsequent step of the method. After evaporation of solvent from the resin impregnated fibers, plies are cut to a desired shape and size and stacked in an autoclave for curing. Since the autoclave is operated at an elevated temperature and superatmospheric pressure, resin exudes from the plies and is thereby lost as a matrix material. It is necessary, therefore, to use an excess of resin and to apply bleeder plies to the surfaces of the composite structure to absorb the exuded resin. When using conventional prepreg systems with honeycomb sandwich materials, there is the added disadvantage of filling honeycomb core cells with resin during cocuring. Furthermore, the requirement of an autoclave is disadvantageous from an economic standpoint, especially when it is desired to fabricate large composites.

It is an object of this invention, therefore, to provide a low flow, vacuum bag curable prepreg material.

Another object of the invention is to provide a method for preparing the prepreg material.

A further object of the invention is to provide high performance, structural composites.

Still another object of the invention is to provide a method of fabricating the composites that eliminates the requirement of an autoclave.

Other objects and advantages of the invention will become apparent to those skilled in the art upon consideration of the accompanying disclosure.

SUMMARY OF THE INVENTION

The present invention resides in a formulation for a prepreg material which comprises the following ingredients:

|  | Parts by weight |
| --- | --- |
| carboxy-terminated vinyl polybutadiene | 100 |
| epoxy novolak resin | 100–150 |
| bis(4-maleimidophenyl)methane (BMPM) | 0–20 |
| 2,5-dimethyl-2,5-di(t-butylperoxy)hexane (peroxide) | 8–10 |
| chromium octoate | 2.5–2.6 |
| epoxy catalyst | 1–5 |

The ingredients of the foregoing formulation are all well known materials which are available from commercial sources. The vinyl polybutadiene containing carboxyl end-caps generally has a high, e.g., 80 to 90 percent, 1.2 vinyl content. However, it is within the scope of the invention to blend a high 1,4(low 1,2) vinyl content polybutadiene with the high 1,2 vinyl polybutadiene. The molecular weight of the polybutadiene usually ranges from about 1000 to 3000. Epoxy novolak resins suitable for use are epoxy cresol novolak and epoxy phenol novolak resins having a high functionality, e.g., a functionality of 3.8 to 5.1. As an epoxy catalyst or curing agent, it is usually preferred to utilize benzyldimethylamine, but other aromatic amines, such as m-phenylenediamine, methylenedianiline, diaminodiphenyl sulfone, and the like can be used. Examples of other epoxy catalysts that can be employed include boron trifluoride monoethylamine, and polycarboxylic acid anhydrides, such as phthalic anhydride, pyromellitic anhydride and maleic anhydride.

In preparing the prepreg material the carboxy-terminated vinyl polybutadine, the epoxy novolak resin and the chromium octoate are mixed together in a solvent until a homogeneous solution is obtained. As a solvent, it is usually preferred to employ a ketone, such as acetone or 2-butanone. However, it is within the scope of the invention to carry out the method in the absence of a solvent.

The resin solution prepared as described in the preceding paragraph is then refluxed for a period of about 0.25 to 3 hours. When using acetone the reflux temperature is about 136° F while with 2-butanone the temperature is about 176° F. During this period epoxy groups react with the carboxy groups since the chromium octoate is a specific catalyst for the epoxy-carboxy reaction and is not effective for promoting epoxy homopolymerization. Since the epoxy-carboxy reaction is the desired reaction, it is critical that chromium octoate be used as the catalyst. At the end of the reflux period, the solution is cooled to room temperature, and the remaining ingredients of the above formulation, i.e., the BMPM if used, the peroxide and the epoxy catalyst are added to the solution. The solution is stirred until a homogeneous solution is obtained. As described hereinafter, this resin solution is used in the fabrication of composites. The resin in solution is a high vinyl polybutadiene endcapped with epoxy novolak resin.

Initially, the reinforcing fibers or filaments, such as carbon or graphite fibers, boron filaments or glass fibers, are circumferentially wound around a rotating drum mandrel to a desired width. The dry tape so formed is then impregnated by any suitable means with the resin solution prepared as described above. Impregnation can be conveniently accomplished by applying the resin solution from a squeeze bottle, or by brushing or spraying on the resin solution. The amount of resin applied is such that the fiber volume is from about 40 to 70, preferably 55 to 60, percent of the tape after evaporation of the solvent. Stated in another manner, sufficient resin is applied so that a final resin content of about 28 to 45 weight percent is obtained. The resin solution is usually applied while the drum mandrel is rotating in order to ensure even distribution of the resin.

After application of the resin solution, the drum mandrel is allowed to rotate at room temperature for a period of time sufficient to permit the solvent to evaporate. Generally, a period of from about 8 to 24 hours is long enough to accomplish the desired evaporation. Thereafter, the tape is removed from the mandrel and cut into plies of a desired size.

The plies are then stacked to a desired thickness. In stacking the plies, they can be positioned either unidirectionally, i.e., with the fibers parallel to one another, or multidirectionally, i.e., with the fibers at an angle with one another, e.g., in a 0°, +45°, −45°, 90° symmetrical pattern to provide pseudo-isotropic panels. A porous glass reinforced Teflon coated fabric is then placed on the top and bottom of the prepreg stack after which a breather cloth, e.g., glass fabric, is laid above and below the Teflon fabric, reaching out to the vacuum vent port. After positioning this assembly on a base plate, a nylon film vacuum bag is installed thereover and sealed to the plate with a commercial vacuum bag sealant After installation of the vacuum bag, air is evacuated from the bag down to about 28 to 30 inches of mercury. There is thus provided a molding pressure of about 14 psi. The assembly is then placed in an air circulating oven for curing of the composite. In the curing operation, the temperature is raised from room temperature to about 325° to 375° F at the rate of 3° to 7° F per minute. After a temperature in the aforementioned range is reached, the composite is maintained at that temperature for 0.75 to 1.5 hours. Upon completion of the cure, the composite is removed from the vacuum bag and postcured in an air circulating oven for about 12 to 18 hours at a temperature ranging from about 375° to 425° C.

As previously mentioned, during the period when the resin solution is refluxed epoxy groups react with carboxy groups to form a high vinyl polybutadiene endcapped with epoxy novolak resin. During the curing operation, the organic peroxide catalyst promotes vinyl polymerization, thereby chain extending the polybutadiene. When used, the BMPM functions as a crosslinking agent for the vinyl double bonds, but it is not a necessary ingredient. In the postcure and partially during the cure, the amine crosslinks the epoxy group, i.e., promotes epoxy homopolymerization. As a result of these reactions, there is substantially no flow of the prepreg material so that it is possible to achieve excellent compaction and densification using vacuum bag pressure and no bleeder plies.

Essentially the same procedure for preparing structural panels as described above can be utilized in the fabrication of honeycomb sandwich panels. Thus, prepreg plies prepared in the above-described manner are placed on the bottom and top of a honeycomb core. If desired, the faying surfaces may be brush coated with the resin solution. Honeycomb cores are well known structures fabricated from various metal, particularly aluminum and titanium alloys. A porous glass reinforced Teflon coated fabric is placed on the prepreg plies, and this fabric is covered with a glass fabric. A non-perforated caul plate is placed on this lay-up which is positioned on a base plate. It is usually desirable to place around the lay-up pieces of angle iron cut to the height and dimensions of the honeycomb core to prevent core crushing. Thereafter, the vacuum bag curing and the postcuring are conducted in the same manner as described above with regard to structural panel fabrication.

The above-described procedures provide a simplified method for preparing structural panels as compared to the conventional method utilizing an autoclave. The composite panels fabricated by the present method possess outstanding physical properties and they are highly moisture resistant. The improvements obtained can be attributed in the final analysis to the low flow prepreg material which makes it possible to utilize the vacuum bag molding procedure. As an added advantage in fabricating honeycomb sandwich panels, use of the material overcomes the problem of resin filling the core cells during cocuring.

A more complete understanding of the invention can be obtained by referring to the following illustrative examples which are not intended, however, to be unduly limitative of the invention.

EXAMPLE I

A run was conducted in which a composite panel was fabricated, utilizing a prepreg material of this invention. The following formulation was used in preparing the prepreg material:

| Ingredient | Parts by weight |
| --- | --- |
| Carboxy-terminated vinyl polybutadiene[1] | 100 |
| Expoxy cresol novolak resin[2] | 137 |
| Bis(4-maleimidophenylmethane) (BMPM) | 15 |
| 2,5-dimethyl-2,5-di(t-butylperoxy)hexane (peroxide) | 8.3 |
| Chromium octoate | 2.6 |
| Benzyldimethylamine | 2.5 |
| 2-Butanone | 560 |

[1] A carboxy-terminated polybutadiene having a 90% 1,2 vinyl content and a molecular weight of 1000
[2] An epoxy cresol novolak resin having a functionality of 5.1

The carboxy terminated vinyl polybutadiene, the epoxy cresol novolak resin, and the chromium octoate were mixed with the 2-butanone until a homogeneous mixture was obtained. The resin solution was then refluxed under condenser at 176° F for 2 hours. The solution was then cooled to room temperature, and the remaining ingredients in the above formulation were added and mixed in until a homogeneous solution was obtained.

Graphite fibers were circumferentially wound on a rotating drum mandrel using a fiber spacing of 7 tows per inch. After winding a 4 inch width of fibers, the fibers were impregnated with the resin solution, using a squeeze bottle for application. Sufficient resin was applied so that a resin content of about 42 weight percent was obtained. Impregnation was done with the drum rotating in order to ensure distribution of the resin. The prepreg tape so prepared was allowed to rotate for about 16 hours in order for the solvent (2-butanone) to evaporate. The tape was then removed from the mandrel and trimmed into plies of the desired size for cure. The plies contained about 45 volume percent of fibers.

The prepreg plies were stacked and weighed prior to cure to determine the percent flow. The stack of prepreg plies was covered on both sides with a Teflon glass reinforced porous fabric. Breather cloths (glass cloth) were then placed above and below the stack, reaching out to the vacuum vent port. This lay-up was then placed inside a vacuum bag and sealed. Air was evacuated from the bag down to 30 inches of mercury. The assembly was then placed in an air circulating oven, and the temperature was raised from room temperature to 350° F at a rate of 6° F per minute. The assembly was maintained at this temperature for 1 hour after which it was cooled to below 150° F under a vacuum. The assembly was then removed from the vacuum bag and postcured in the circulating air oven at 400° F for 16 hours.

The resulting composite panel had an excellent appearance and contained no visible cracks, voids or blisters. The panel had the mechanical properties set forth in the following table:

TABLE 1

| Flexural strength, $10^3$ psi | 185.0 |
| Flexural modulus, $10^6$ psi | 13.2 |
| Shear strength, $10^3$ psi | 11.6 |

EXAMPLE II

A run was carried out in which a composite panel was fabricated, using the same prepreg material and following the same procedure as described in Example I. However, in this run the prepreg plies contained 50 volume percent of fibers. The composite panel had the properties set forth below in Table II.

TABLE II

|  | Initial | Humidity-Aged[1] | % Retention |
|---|---|---|---|
| Flexural strength, $10^3$ psi |  |  |  |
| at Room Temp. | 204 | 187 | 92 |
| at 275° F | 148 | 140 | 95 |
| Shear Strength, $10^3$ psi |  |  |  |
| at Room Temp. | 10.1 | 9.7 | 97 |
| at 275° F | 7.0 | 7.5 | 107 |
| Weight change, % |  | 0.3 |  |

[1]30 days at 120° F and 100% humidity.

EXAMPLE II

A run was conducted in which a pseudo-isotropic composite panel was fabricated. The same prepreg material was utilized to prepare prepreg plies as described in Example I except that the plies contained 50 volume percent of fibers. Furthermore, the same procedure was followed as in Example I in the curing and postcuring. However, the plies were stacked in a 0°, 45°, 90° symmetrical pattern to provide a pseudo-isotropic panel. The composite panel had the properties set forth below in Table III.

TABLE III

|  | 0° | 45° | 90° |
|---|---|---|---|
| Tensile strength, $10^3$ psi |  |  |  |
| at Room Temp. | 45.8 | 43.5 | 44.0 |
| at 275° F | 44.7 | 46.2 | 42.2 |
| Tensile modulus, $10^3$ psi |  |  |  |
| at Room temp. | 4.9 | 4.7 | 4.6 |
| at 275° F | 4.1 | 4.1 | 4.3 |

EXAMPLE IV

A run was conducted in which a honeycomb sandwich panel was fabricated. The same prepreg material was used in preparing prepreg plies as described in Example I.

The honeycomb core (Hexcel CR-III, 1/8 inch cell, 1.5 mil non-perforated 5052 aluminum alloy of 6.1 lbs/ft³ density) was degreased prior to use. A four-ply lay-up of 0°, 90°, 90°, 0° configuration in the honeycomb ribbon direction was used for each facing skin. The four prepreg plies were placed on the top and bottom of the honeycomb core. A porous glass reinforced Teflon coated fabric was placed on the prepreg plies, and this fabric was covered with a Style 181 glass fabric. A non-perforated caul plate was placed on this lay-up which was positioned on a base plate. Pieces of angle iron cut to the height and dimensions of the honeycomb core were placed around the lay-up. Thereafter, the vacuum bag curing and the postcuring were carried out in the manner and under the conditions described in Example I.

The co-cured honeycomb sandwich panel had a flatwise tensile strength of 600 psi.

The data in the foregoing tables indicate that the composite panels possessed excellent physical properties. The high flatwise tensile strength of the honeycomb sandwich panel indicates that there was an excellent bond between the skins and core.

The composite panels were weighed after postcuring and their weight compared with those of the prepreg stacks. This comparison indicated that there was less than 1 percent of resin flow. Because there is substantially no resin flow during the vacuum molding procedure, it is unnecessary to apply an excess of resin over that required for the finished laminate and to utilize bleeder plies as are necessary in the case of the conventional method employing an autoclave.

As will be evident to those skilled in the art, various modifications of the present invention can be made in view of the foregoing disclosure without departing from the spirit and scope of the invention.

We claim:

1. A method for fabricating a composite panel which comprises the following steps:
   a. mixing in a common solvent 100 parts by weight of a carboxy terminated vinyl polybutadiene and 100 to 150 parts by weight of an epoxy novolak resin with 2.5 to 2.6 parts by weight of chromium octoate;
   b. refluxing the resulting solution for a period of about 0.25 to 3 hours;
   c. at the end of the reflux period, cooling the solution to room temperature;
   d. adding to the cooled solution 8 to 10 parts by weight of 2,5-dimethyl-2,5-di(t-butylperoxy)hexane and 1 to 5 parts by weight of benzyldimethylamine;
e. stirring the solution containing the added materials, thereby obtaining a resin solution;
f. coating the resin solution on a tape formed of reinforcing fibers;
g. evaporating solvent from the resin solution, thereby obtaining tape impregnated with the resin;
h. cutting the resin impregnated tape into plies of a desired size;
i. stacking the plies to a desired thickness;
j. placing a porous glass reinforced Teflon coated fabric on the top and bottom of the stack of plies;
k. laying a breather cloth above and below the Teflon coated fabric;
l. positioning the resulting assembly on a base plate and installing a vacuum bag thereover sealed to the base plate;
m. evacuating air from the bag down to about 28 to 30 inches of mercury;
n. placing the assembly in an air circulating oven;
o. raising the temperature in the oven from room temperature to about 325° to 375° F at a rate of 3° to 7° F per minute; and
p. maintaining the assembly at a temperature in the aforementioned range for a period of 0.75 to 1.5 hours, thereby obtaining a cured composite panel, the amount of resin in the panel being substantially equal to the amount of resin in the stacked plies.

2. The method according to claim 1 in which the cured composite panel after removal from the vacuum bag is postcured in an air circulating oven for about 12 to 18 hours at a temperature ranging from about 375° to 425° F.

3. The method according to claim 1 in which a stack of the plies is placed on the bottom and top of a honeycomb core; the porous glass reinforced Teflon coated fabric is placed on the stacks of plies; the breather cloth is laid above and below the Teflon coated fabric; the resulting assembly is placed on the base plate having installed thereover the vacuum bag sealed to the base plate; and a cocured honeycomb sandwich panel is obtained, the amount of resin in the panel being substantially equal to the amount of resin in the stacks of plies.

4. The method according to claim 2 in which the cocured honeycomb sandwich panel after removal from the vacuum bag is postcured in an air circulating oven for about 12 to 18 hours at a temperature ranging from about 375° to 425° F.

5. A prepreg material consisting essentially of the following components:

a. the reaction product obtained by reaction 100 parts by weight of a carboxy terminated vinyl polybutadiene and 100 to 150 parts by weight of an epoxy novolak resin in the presence of 2.5 to 2.6 parts by weight of chromium octoate;
b. zero to 20 parts by weight of bis(4-maleimidophenyl)methane;
c. 8 to 10 parts by weight of 2,5-dimethyl-2,5-di(t-butylperoxy)hexane; and
d. 1 to 5 parts by weight of epoxy catalyst.

6. The prepreg material according to claim 5 in which the carboxy terminated vinyl polybutadiene has a 1,2 vinyl content of about 80 to 90 percent.

7. The prepreg material according to claim 6 in which the epoxy novolak resin is an epoxy cresol novolak resin or an epoxy phenol novolak resin having a functionality of 3.8 to 5.1.

8. The prepreg material according to claim 7 in which the epoxy catalyst is an aromatic amine.

9. The prepreg material according to claim 8 in which the aromatic amine is benzyldimethylamine.

10. A method for preparing a prepreg material which comprises the following steps:
a. mixing in a common solvent 100 parts by weight of a carboxy terminated vinyl polybutadiene and 100 to 150 parts by weight of an epoxy novolak resin with 2.5 to 2.6 parts by weight of chromium octoate;
b. refluxing the resulting solution for a period of about 0.25 to 3 hours;
c. at the end of the reflux period, cooling the solution to room temperature;
d. adding to the cooled solution 8 to 10 parts by weight of 2,5-dimethyl-2,5-di(t-butylperoxy)hexane and 1 to 5 parts by weight of benzyldimethylamine; and
e. stirring the solution containing the added materials, thereby obtaining a homogeneous solution of a prepreg material consisting essentially of a high vinyl polybutadiene endcapped with epoxy novolak resin, 2,5-dimethyl-2,5-di(t-butylperoxy)hexane and benzyldimethylamine.

11. The method according to claim 10 in which the carboxy terminated vinyl polybutadiene has a 1,2 vinyl content of about 80 to 90 percent and the epoxy novolak resin is an epoxy cresol novolak resin or an epoxy phenol novolak resin having a functionality of 3.8 to 5.1.

12. The method according to claim 11 in which the common solvent in acetone and the solution is refluxed at a temperature of about 136° F.

13. The method according to claim 11 in which the common solvent is 2-butanone and the solution is refluxed at a temperature of about 176° F.

* * * * *